Aug. 5, 1952  W. C. OLIVER  2,605,474
HYDRAULICALLY CONTROLLED ARTIFICIAL LEG
Filed Nov. 22, 1947  7 Sheets-Sheet 1

INVENTOR.
WILBUR C. OLIVER
BY HIS ATTORNEYS.
HARRIS, KIECH, FOSTER & HARRIS

Aug. 5, 1952 W. C. OLIVER 2,605,474
HYDRAULICALLY CONTROLLED ARTIFICIAL LEG
Filed Nov. 22, 1947 7 Sheets-Sheet 2

INVENTOR.
WILBUR C. OLIVER
BY HIS ATTORNEYS.
HARRIS, KIECH, FOSTER & HARRIS

Aug. 5, 1952 W. C. OLIVER 2,605,474
HYDRAULICALLY CONTROLLED ARTIFICIAL LEG
Filed Nov. 22, 1947 7 Sheets-Sheet 3

INVENTOR.
Wilbur C. Oliver
BY
Attorneys

Aug 5, 1952     W. C. OLIVER     2,605,474
HYDRAULICALLY CONTROLLED ARTIFICIAL LEG
Filed Nov. 22, 1947     7 Sheets-Sheet 5

INVENTOR.
Wilbur C. Oliver
BY
Attorneys

Aug. 5, 1952 — W. C. OLIVER — 2,605,474
HYDRAULICALLY CONTROLLED ARTIFICIAL LEG
Filed Nov. 22, 1947 — 7 Sheets-Sheet 7

INVENTOR.
Wilbur C. Oliver
BY
Attorneys

Patented Aug. 5, 1952

2,605,474

UNITED STATES PATENT OFFICE 2,605,474

HYDRAULICALLY CONTROLLED ARTIFICIAL LEG

Wilbur C. Oliver, Burbank, Calif., assignor to Adel Precision Products Corp., Burbank, Calif., a corporation of California Application November 22, 1947, Serial No. 787,564

20 Claims. (Cl. 3—2)

This invention relates generally to prosthetic devices or artificial limbs and particularly to an artificial leg adapted for use by an above-the-knee amputee, that is, a person having a portion of a leg amputated between the knee and hip and having a remaining thigh stump to which the artificial leg is detachably connected.

Prior art artificial legs suitable for use by above-the-knee amputees have suffered from certain common defects. The need for some locking means for locking the knee joint against undesired collapsing under the weight of the amputee has resulted in the provision of knee lock devices which, though sometimes partially automatic, produce "peg-leg action" of the wearer and discomfort occasioned by the transmission to the thigh stump of a fore-and-aft torque, that is, a torque that about a transverse axis, causes irritation thereto. Objects of the present invention are to provide an artificial leg to be used by above-the-knee amputees which is capable of closely approximating the leg motions of a normal, sound leg by virtue, in part, of the substitution for the conventional knee lock of a kinematic linkage that maintains a predetermined interrelation between knee flexure and foot flexure and is automatically controlled by the application to the leg and release from the leg of the weight of the amputee; to provide an artificial leg that does not exert irritating fore-and-aft or axial torques on the stump, and that includes shock absorbing means for cushioning the movement of the components at the knee and ankle joints and that stores up energy normally dissipated by a sound leg, returning such energy to the body so as to reduce the muscular effort required of the amputee.

In certain preferred embodiments the leg of the present invention principally comprises a thigh member, a shank member, a foot member, and two separate four-bar-linkages for interrelating the motions of these three members. One of these four-bar-linkages includes a portion of the thigh member, the shank member, a portion of the foot member, and a fourth link connected to the thigh member on one side of the knee pivot and to the foot member on the opposite side of the ankle pivot. This fourth link is rendered extensible and contractible by virtue of including a hydraulic piston and cylinder combination which can, however, be locked against contraction. The other four-bar-linkage includes a portion of the thigh member, the shank member, a portion of the foot member, and an extensible-contractible link connected between the thigh member and the foot member. The two linkages are operative more or less independently each at different times and never at the same time during the locomotion cycle for causing interrelated knee and ankle rotations.

Other objects and many of the attendant advantages of this invention will be readily appreciated as the same becomes better understood by reference to the following detailed description when considered in connection with the accompanying drawings wherein.

For a description of the general construction of a preferred embodiment of the invention reference is now made particularly to Figs. 1 through 10 from which it will be seen that the improved artificial leg comprises, essentially, a thigh member 20, a leg shank member 21 pivotally connected to the lower end of the thigh member 20 by means of a knee bolt indicated generally at 22 (Fig. 5), a foot member 23 pivotally connected to the lower end of the leg shank member 21 by an ankle bolt referred to generally by the reference character 24, and a toe member 25 pivotally connected to the forward end of the foot member by a pin 26.

Figures 1, 2:
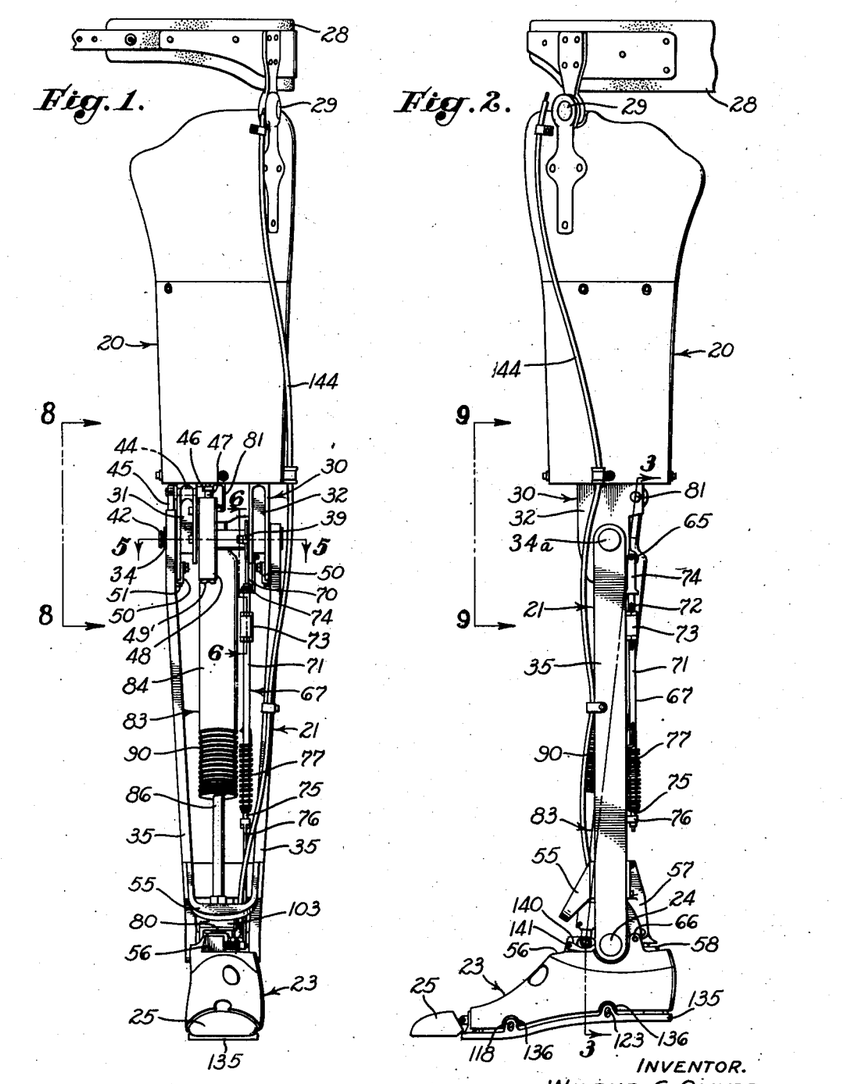
Fig. 1 is a front elevational view of an artificial leg constructed in accordance with my invention.
Fig. 2 is a side view of the same.

The thigh member 20, sometimes referred to as a bucket or socket, can be constructed from any suitable light-weight material and is made hollow at its upper end to adapt it to receive the thigh stump of the amputee. Any suitable means can be employed for retaining the thigh member 20 connected to the thigh stump, Figs. 1 and 2 illustrating a belt 28, pivotally attached to the thigh piece at 29 and adapted to encircle the waist of the amputee for this purpose.

Figures 3, 4, 5, 6, 7:
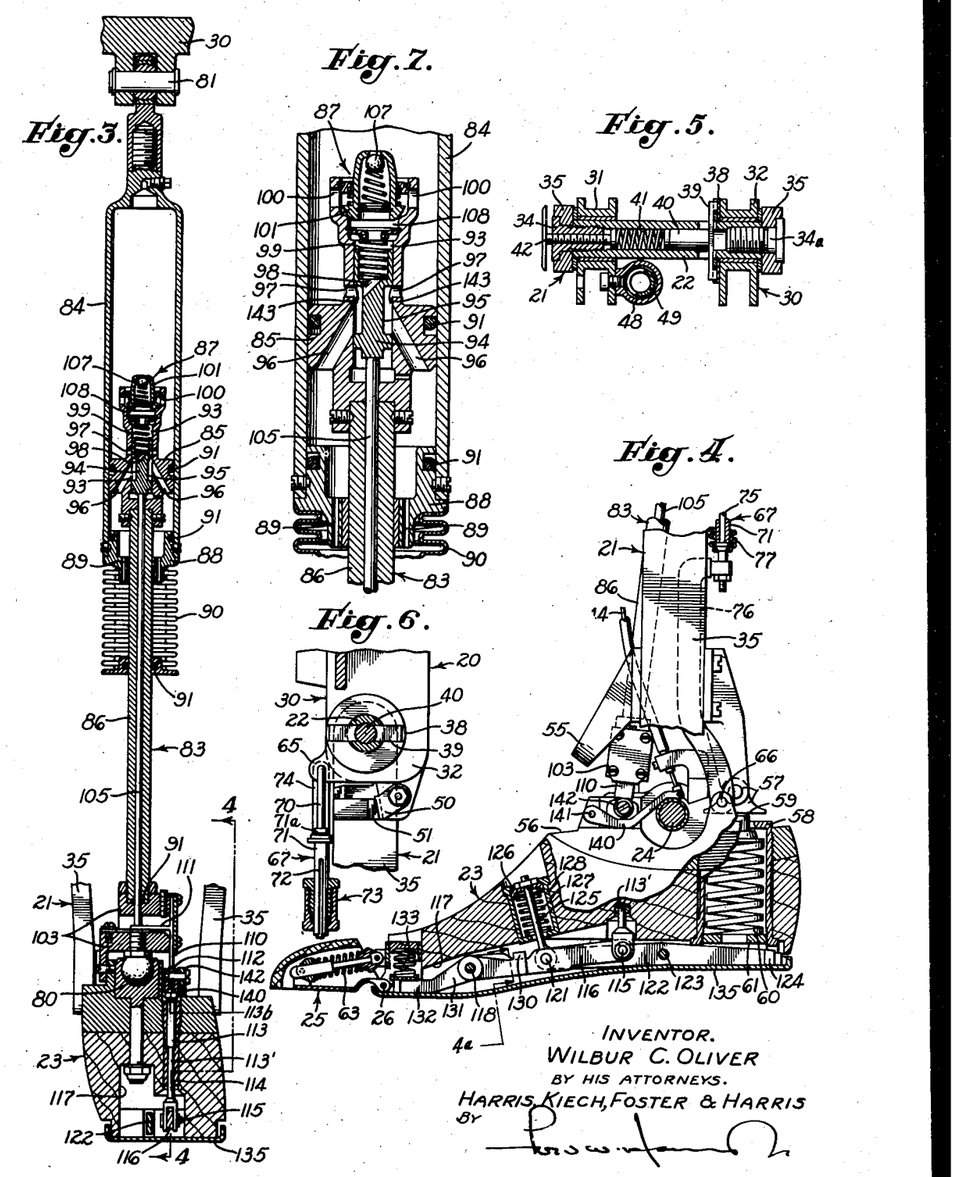
Fig. 3 is an enlarged longitudinal sectional view, taken on the line 3—3 of Fig. 2.
Fig. 4 is a sectional view through the lower part of the artificial leg, taken on line 4—4 of Fig. 3.
Fig. 5 is an enlarged transverse sectional view through the knee pivot taken on the line 5—5 of Fig. 1.
Fig. 6 is an enlarged vertical sectional view taken on line 6—6 of Fig. 1.
Fig. 7 is an enlarged sectional view of the hydraulic locking piston.

Constituting the lower end of the thigh member 20 is a bifurcated bracket 30 having laterally-spaced depending arms 31 and 32 which, as shown in Fig. 5, have aligned bearing apertures provided with bushings in which the knee bolt 22 is rotatably held. The knee bolt 22 is tubular and the ends of its axial bore are provided with screw threads for receiving headed, bolt-like extension elements 34, 34a. The outer projecting heads of the elements 34, 34a provide for tightening such that the upper ends of a pair of shank elements 35 cause the knee bolt 22 to rotate with the shank elements 35, the two elements together constituting the leg shank member 21. Surrounding the knee bolt 22 and positioned against the inner face of the stationary arm 32 is a friction washer 38 which is urged axially into engagement with the arm 32 by a strip 39 passing transversely through apertures in the opposite sides of the tubular knee bolt 22. The strip 39 is moved in a direction to force the friction washer 38 against the arm 32 by means of a plunger 40 within the bolt 22, the plunger being operated by a compression spring 41. The force of the spring 41 can be varied by an adjusting screw 42 so as to regulate the degree of friction between the knee bolt and its supporting bracket and consequently the resistance to relative pivotal movement between the thigh member and the leg shank member 21. It is thus seen that the leg shank member 21, comprising the shank elements 35, is pivotally connected to the thigh member 20 by the bolt 22 and elements 34, 34a to form the knee and that controlled relative pivotal movement between the thigh and shank members is permitted when the shank member is freely suspended from the bolt, as when the artificial leg is in raised position.

Figure 8:
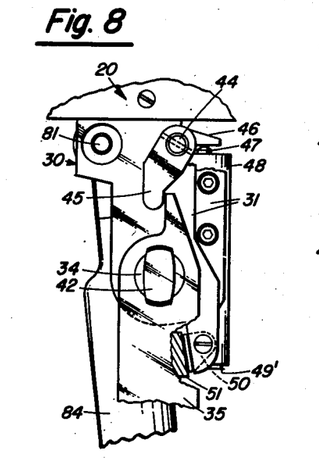
Fig. 8 is an enlarged side elevational view taken in the direction 8—8 of Fig. 1 showing details of the yieldable knee bumper and positive knee stops of the embodiment of Fig. 1.
Figure 9:
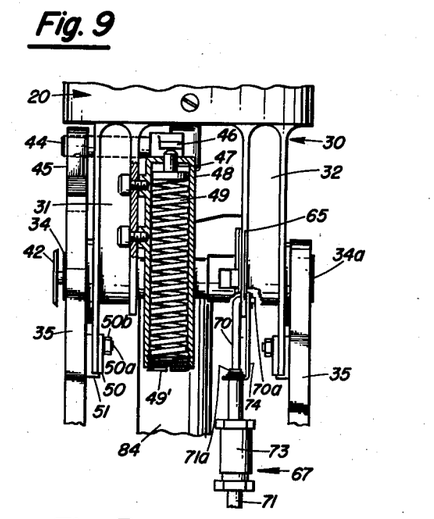
Fig. 9 is an enlarged elevational view, partly in cross section, taken in the direction 9—9 of Fig. 2 showing details of the yieldable knee bumper and details of the structure of part of one of the extensible-contractible links.

Pivoted in a transverse hole in the arm 31 of the bracket 30 is a pin 44 having a finger 45 at its outer end (Figs. 1, 8, 9) which is adapted to be engaged by the side of one of the shank elements 35 when the thigh and leg shank members are relatively pivoted in a direction to cause unflexing or extension of the knee. The inner end of the pin 44 carries a second finger 46 which rests upon the upper end of a plunger 47 slidable in a casing 48 mounted on the arm 31 (Figs. 5, 8, 9), the plunger being actuated by a coil spring 49. The force of the spring 49 can be varied by means of a plug 49' screwed into the lower end of the casing 48 (Figs. 1, 8, 9). By this construction, as the thigh and shank members approach their limit of pivotal movement to extend the knee the spring-actuated plunger 47 acts as a shock absorber to cushion the shock of impact. This means constitutes what can be designated a yieldable knee bumper. A positive knee stop is also provided for limiting the extension of the knee, the drawings (Figs. 6, 8, 9) showing stop fingers 50 carried by the arms 31 and 32 and engageable with lugs 51 on the shank elements 35. The fingers 50 may be adjustably mounted by means of an elongated slot (not shown) in each of them through which passes a screw 50a to coact with nut 50b to hold the fingers in any desired position of adjustment on the arms 31 and 32 so as to determine the knee angle for the configuration that exists when the knee is fully extended.

The leg shank elements 35 carry the transverse pin or ankle bolt 24 (Figs. 2, 4) between their lower ends and pivotally mounted on the ankle bolt between the elements is the foot member 23 which is made to closely resemble a human foot and which is of a size corresponding to the amputee's other, or sound, foot. The foot and leg shank members 23 and 21 are adapted for relative pivotal movement about the ankle bolt 24 so as to provide plantar-flexion (increase in ankle angle) and dorsiflexion (decrease in ankle angle) of the foot member. A stop finger 55, carried by the shank elements 35, is adapted to strike a flattened surface 56 on the foot member 23 to limit maximum dorsiflexion of the ankle. Maximum plantar-flexion of the foot member 23 is limited by the engagement of the lower end of a second stop finger 57 (Figs. 2, 4) with the upper end of a shell 58 adjustably screwed into the bottom of the foot member with its upper end projecting from the top of the foot member. Slidable in the shell 58 is a plunger 59 which is urged upwardly therein by a precompressed coil spring 60, the compression of which can be adjusted by a disc 61 screwed into the lower end of the shell. As the foot member 23 enters the plantar-flexion range of its motion, the stop finger 57 engages and depresses the plunger 59 which then acts to absorb shocks. The spring plunger 59 also serves the function of storing up energy normally dissipated by a normal leg as the heel of the artificial leg contacts the ground or other surface and the foot plantar flexes, the stored energy being exerted to assist the rising motion of the artificial leg as the body moves forward. An additional source of energy for storage by spring 60 simultaneously with plantar-flexion and exertion simultaneously with dorsi-flexion will be shown later.

The toe member 25 is of hollow structure and is pivoted to the forward end of the foot member 23 by the pin 26 (Fig. 4). The toe member 25 is normally held in the extended position shown in Figs. 2 and 4 under the action of a spring 63 which is adapted to yield to permit flexing of the toe.

One of the two four-bar-linkages, previously mentioned as the means for effecting relative knee and ankle rotations will next be described in detail. Using a practice commonly accepted in the field of kinematics of designating a link by a pair of indicia, each referring to the region at or near one of the pivot axes of the link, this four-bar-linkage can be designated as: 22—24, 24—66, 66—70a, 70a—22 (Figs. 2, 4, 6, 9, 13). Alternatively the linkage can be designated by a single indicium assigned to each link, thus: 21, 23, 67, 20. It can be seen, then, that this linkage, in effect is a trapezium of which one long side or bar comprises the leg shank member, designated, as hereinbefore noted, generally by the reference character 21. One short side or bar 70a—22 is, in actual practice, that portion of the thigh member 20 which is disposed between the knee bolt 22 and a boss 65 on the bracket 30 located rearwardly of the knee bolt. This bar can also be designated simply by the numeral 20. The other short side or bar 24—66 of the trapezium comprises that portion of the foot member 23 which is disposed between the ankle bolt 24 and a pin 66 carried by the foot member rearwardly of the ankle bolt. This bar can be designated simply by the numeral 23. The fourth side or bar 66—70a is represented generally by the reference character 67 in Figs. 1, 2, 4, 6 and, in accordance with the invention, comprises an extensible, contractible link.

Reference being made to Figs. 1, 2, 6 and 9, the link 67 is seen to include an upper friction rod 70 having its upper end 70a bent at right angles to the main body of the rod 70 to form a pin hooked through a hole in the boss 65. The lower end of the rod 70 is slidably disposed in the upper end of a tube 71 which is slit, as shown at 72, to adapt the sides of the tube to be drawn toward each other to frictionally grip the rod, the sides being adjustably compressed by a contracting device shown at 73 to permit restrained movement between the tube and rod. The tube 71 is restrained from downward motion from the position shown by an angular bracket 74 and slidable in the lower end of the tube is the upper end of an extension rod 75. The lower end of the rod 75 is joined to the upper end of a connecting element 76 (Figs. 1, 2, 4), the lower end of which is pivotally connected to the pin 66, previously mentioned as carried by the foot member 23. A tension spring 77 surrounds the rod 75 and has one end fastened to the rod and its other end hooked through an aperture in the tube 71 so that the rod is telescoped thereby into the tube to normally contract the over-all length of the link 67. By this construction, the "slip-joint link" 67 is free to lengthen against spring tension and to shorten against a frictional drag. It is to be noted that the tension of the spring 77 is greater than the frictional drag imposed by the device 73. It is also to be noted at this point that the frictional drag is so adjusted that it is greater than the friction of the piston and shaft seals of the hydraulic cylinder link, to be presently described.

Figure 3A:
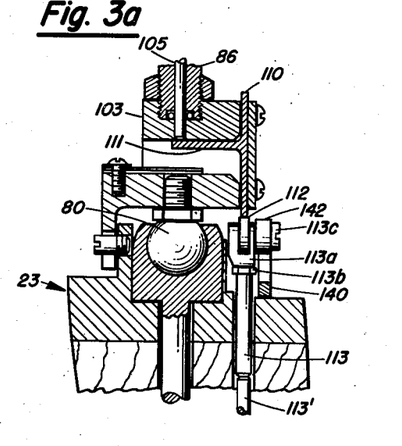
Fig. 3a is an enlarged cross-sectional view substantially identical to the lower part of Fig. 3 showing the details of part of the control mechanism of the embodiment of Fig. 3.
Figure 4A:
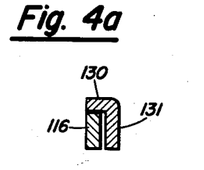
Fig. 4a is an enlarged cross-sectional view taken along the line 4a in Fig. 4 showing the interrelation of two levers in the foot mechanism in the embodiment in Fig. 4.

The other four-bar-linkage, the "hydraulic cylinder four-bar-linkage," designated 22—24, 24—80, 80—81, 81—22, also constitutes a trapezium. This trapezium has one of its short sides 24—80 formed by that portion of the foot member 23 disposed between the ankle bolt 24 and the spherical knuckle pin 80, which bears in a socket block fixed to the foot member 23 (Figs. 1, 3, 3a). The other short side 81—22 is formed by that portion of the extension or bracket of the thigh member 20 disposed between the knee bolt 22 and the pin 81. These two short sides or bars can, as hereinbefore indicated, be designated simply by the numerals 23 and 20, respectively. One long side of the trapezium comprises the leg shank member 21 while the other long side consists of a hydraulic cylinder link 83 to be next described. Thus this linkage can be designated as 21, 23, 83, 20, it being remembered, however, that in this association the numerals 23 and 20 represent, respectively, those certain portions of the foot member and thigh member immediately hereinafter specified whereas in the association 21, 23, 67, 20, designating the slip-joint four-bar-linkage, the numerals 23 and 20 represent certain other portions of the foot member and thigh member.

The hydraulic cylinder link 83 includes a cylinder link 84 in which is slidable a piston 85 having a piston rod 86 projecting from the cylinder, and internal valve means 87 (Figs. 3, 7) for effecting bleeding of hydraulic fluid from either side of the piston to the other side. The novel construction of the hydraulic cylinder piston and valve means is disclosed in detail and claimed in another patent application filed concurrently by me, now Patent No. 2,453,855, issued November 16, 1948, and thus the present description will include only such details as have direct bearing on the function of the artificial leg. The hydraulic cylinder 84 is arranged substantially vertical or lengthwise of the leg structure and its upper end is pivotally connected to the pin 81 which is carried by the bracket 30 and disposed rearwardly of and above the knee bolt 22. The cylinder 84 has an end cap 88 at its lower end in which the piston rod 86 is slidable, the cap having holes 89 through which hydraulic fluid may pass from the lower end of the cylinder into a bellows element 90. Resilient O rings 91 are employed for sealing the various parts against leakage of fluid and for creating slight frictional drag between the movable parts.

The piston 85 has an axial bore 93 in which a valve member 94 is positioned and adapted to slide, the member having a peripheral groove or passage 95 adapted to register with inclined ports 96 and radial ports 97 in the piston as the latter is shifted axially in the cylinder 84. The valve member 94 has an end passage 98 and is urged downwardly in the bore 93 under the influence of a spring 99 so as to close the ports 97, as shown in Fig. 3. With the valve member 94 in this position, fluid may flow from the lower end of the cylinder 84 into the upper hollow end of the piston, from which point it passes into the upper end of the cylinder by way of holes 100 when under sufficient pressure to open a check-valve 101. The lower end of the piston rod 86 is attached to a block 103 which, in turn, is pivotally connected to the foot member 23 by means of the spherical knuckle pin 80 which is disposed forwardly of the ankle bolt 24. It is thus seen that because fluid can bleed from the lower end to the upper end of the cylinder 84, the cylinder is adapted to move upwardly with respect to the piston 85 so as to permit extension of the hydraulic link 83.

On the other hand, because the fluid cannot bleed from the upper to the lower end of the cylinder, when the valve member 95 is in the position shown in Fig. 3, the cylinder is locked against downward sliding movement and the link 83 is thus prevented from contracting in length. Such is the case when the weight of the amputee is supported by the artificial leg, that is, when the foot member 23 is pressed firmly against the ground. Under this circumstance the hydraulic cylinder four-bar-linkage behaves like a conventional four-bar-linkage in the respect that all its links are incontractible. An inherent property of such a linkage is that when one of its links is fixed, movement of any of the others produces predetermined, constrained, interrelated motions among all four links. This is shown more or less schematically in Figs. 16, 17 and 18 which represent, in that order, the sequence of configurations of the hydraulic cylinder four-bar-linkage 21, 23, 83, 20 with the hydraulic link locked against contraction during normal forward locomotion of the wearer. As is seen in these figures, decrease of ankle angle occasioned by the forward motion, during walking, of the amputee causes an increase in knee angle by virtue of the constraints inherent in the linkage. It is thus apparent that extension or straightening of the knee of the artificial leg and flexing of the knee is controlled so as to enable the leg to support the entire weight of the amputee without danger of collapsing.

The valve member 94 is urged upwardly against the action of the spring 99 by a valve-actuating rod 105 which is slidable axially in the piston rod 86. To accomplish this upward urging of the valve member 94, the rod 105 is, in turn, urged upwardly by a spring-pressed mechanism (hereinafter described) in the foot member, the action of which mechanism can be overcome by means on the foot member that respond to the application of the amputee's weight to the foot. When the valve member 94 is in the raised position shown in Fig. 7, fluid may flow from the upper or high pressure side to the lower or low pressure side and from the lower to the upper side of the piston 85 by way of the ports 96, groove 95 and ports 97 so that the hydraulic link 83 may extend or contract in length to permit relatively unconstrained extension or flexing, the latter through a relatively large angle, of the knee. In general, it is desirable that this unconstrained motion be allowed to occur when the artificial leg is suspended or raised above the ground with no weight of the amputee being supported by the leg, as during a swing-through in normal walking. Similarly, it is in general desirable that unconstrained knee flexion be prevented when the leg is supporting the weight of the amputee to avoid collapse of the leg. Both of these desiderata are accomplished by the alternative operation of the aforementioned spring-pressed mechanism and weight-application-responsive means respectively.

A maximum load valve 107 is provided within the check valve 101 to limit the pressure possible on the high pressure side of the piston. Energy is dissipated as the fluid flows through the maximum pressure valve 107 into a chamber 108 and thence to the low pressure side of the piston. The maximum load valve may be set to open at a pressure slightly greater than the maximum encountered in normal use. By this provision, the amputee's stump and the structural elements of the artificial leg will be protected in the event shock loads are imposed on the leg. The change in volume within the cylinder 84 as the piston rod 86 moves in and out is accommodated by the metal bellows 90. The bellows 90 extends as the piston rod moves into the cylinder and contracts as the rod moves out.

The weight-application-responsive means, referred to hereinbefore, for operating the valve-actuating rod 105, includes a slide member 110 arranged for vertical sliding movement in the block 103 and having a horizontal portion 111 underlying the lower end of the rod 105 (Figs. 3, 3a). The slide member 110 is adapted to be normally slid upwardly by a roller 112 carried at the upper end of a two-art rod 113, 113' which is slidable in a vertical bearing sleeve 114 in the foot member 23 (Figs. 3, 3a, 4). To facilitate the attachment of the roller 112 the upper end 113a of the rod 113 is conveniently constructed as a separate piece bifurcated to provide guide surfaces for the roller 112 and screwed on to the upper end of rod 113 where it is held against unscrewing by locknut 113b. The roller 112 turns on a shaft constituted by a portion of screw 113c which is tightly threaded into the bifurcated end 113b. The upper part 113 of the push-rod bears against the lower part 113', the lower bifurcated end of the latter being pivotally connected at 115 to the rearward end of a lever 116 which is disposed in a recess 117 in the lower portion of the foot member 23 and pivoted on a transverse pin 118 (Fig. 4).

Substantially midway between the pins 118 and 115, the lever 116 is connected by a pin 121 to the forward end of a "heel contact" lever 122 which is pivoted on a transverse pin 123 and which has its rearward free end 124 disposed adjacent the heel portion of the foot member 23. Carried by the connecting pin 121 is a plunger-rod 125 having a disc 126 at its upper end which is engaged by a "heel pressure" compression spring 127 held in a pocket 128, the spring acting, by virtue of its precompression, to pivot the lever 116 in counterclockwise direction about pin 118 and swing the lever 122 in clockwise direction about pin 123, as viewed in Fig. 4. The upper edge of the lever 116 is adapted to be engaged by a lateral lug 130 (Figs. 4, 4a) at the rearward end of a "ball contact" lever 131 which is pivoted on the pin 118 and extends to the region of the ball of the foot. The forward free end 132 of the lever 131 is normally depressed by means of a "ball pressure" spring 133.

A contact plate 135, of the same general shape as that of the bottom of the foot member 23, has upstanding ears 136 at its sides (see Fig. 2), the ears having slots through which the outer ends of the pins 123 and 118 project. The contact plate 135 thus is mounted for vertical sliding movement and its rearward end contacts the end 124 of the lever 122 while its forward end engages the end 132 of the lever 131. It is apparent from the above that when the heel of the foot member 23 is placed against the ground during walking the lever 122 is pivoted in a direction to swing the lever 116 downwardly against the action of the spring 127, the tension of which is adjustable, and to draw the push-rod (part 113') downward to cause the push-rod part 113, roller 112, slide 110, 111, actuating rod 105, and valve member 94 to move downwardly under the action of the spring 99. In this manner the hydraulic cylinder link 83 is locked against contraction but the link is permitted to extend in length.

After the heel of the foot member 23 contacts the ground and the link 83 is thus locked against contraction, to prevent uncontrolled flexing of the knee, the foot may plantar flex until the foot is flat against the ground and then dorsiflex a predetermined extent as controlled by the four-bar-linkages and the knee-stops in the manner later explained. At this juncture, further dorsiflexion is prevented so that the leg rolls over the ball of the foot as the weight of the amputee moves forwardly. During this rolling movement the hydraulic link 83 remains locked by reason of the weight being applied progressively forward along the plate 135 to press the lever 132 against the spring 133. It is seen therefore that the automatic lock control is responsive to weight application at any point on the bottom of the foot.

The "heel pressure spring" 127 is of sufficient load to overbalance the action of the valve spring 99 through the linkage, plus allowance for friction. Weight required on the heel in order to lock the cylinder 84 is equal to the heel pressure spring load minus the valve spring load, as modified by the linkages, plus friction. Weight application on the ball or toe necessary to lock the cylinder is adjustably greater than that necessary on the heel so that the cylinder will become unlocked as soon as a predetermined portion of the weight of the amputee is shifted to the sound leg. Spring 127 can be adjusted so that cylinder 84 is unlocked when the load on the ball of the foot reduces to about 20 pounds, for example.

Voluntary control means are provided for over-riding the automatic control so that the knee can be flexed even though weight is being supported by the artificial leg. A voluntary control lever 140 is pivoted on a pin 141 on the foot member 23 (Figs. 3a, 4) and is disposed beneath a second roller 142 carried by the upper push-rod part 113a, the arrangement being such that upward pivotal movement of the lever 140 causes upward sliding movement of the valve-actuating rod 105 and valve 94 and consequent unlocking of the hydraulic cylinder. Preferably, V-shaped slots 143 are provided in the bore 93 of the piston 85 (Fig. 7) and communicate with the ports 97 so that when the voluntary control lever 140 is raised to a slight extent from the position shown in Fig. 3, fluid can flow slowly from the upper to the lower end of the cylinder to permit flexure of the knee. In Figs. 1 and 2, a Bowden wire cable 144 is shown as connected to the free end of the voluntary control lever 140 for operating the same at the will of the amputee. The upper end of the cable can be suitably connected to be operated by thigh muscles, movement of the hip or shoulder, or expansion of the chest muscles, the present invention not being concerned with the manner of operating the cable since such expedients are old in the art.

Figure 11:
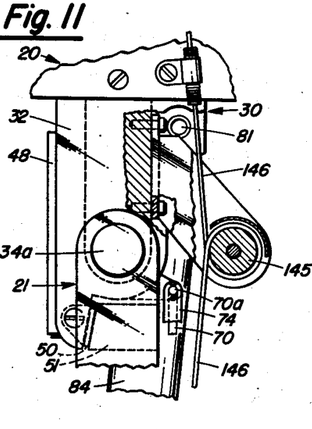
Fig. 11 is a fragmentary side elevational view, partly in cross-section, showing a modification of the embodiment of Fig. 2.

It is within the concept of the present invention to provide means for effecting a "follow-up" action such that a movement of the voluntary control cable causes knee flexure of a fixed amount only. To produce such action, a pulley 145 may be rotatably mounted on the bracket 30, rearwardly of the knee bolt 22, as indicated in Fig. 11. A cable or cord 146 wound around the pulley has its lower end connected to the voluntary control lever 140 and its upper end joined to any suitable manually operable device. When the upper end of the cable 146 is pulled upwardly a fixed amount, the control lever 140 is raised to unlock the hydraulic cylinder 84 to permit knee flexure. The degree of knee flexure is limited however because the distance between the control lever 140 and the pulley 145 is shortened during knee flexure and this causes the length of cable extending between the pulley and control lever to become slack and the lever to become inactive so that the hydraulic cylinder will be again locked to prevent further knee flexure. The extent of flexure of the knee, while the weight of the amputee is supported by the artificial leg, is thus governed by the amplitude of movement imparted to the cable. If desired, a continuous pull may be exerted on the cable 146 to maintain the cable taut and the control lever operative so as to produce complete flexure of the knee, as when kneeling.

*Operation of the artificial leg*

Prior to analyzing the operation of the artificial leg it is desirable to review the principal structural arrangement of the leg. Essentially there are, as hereinbefore noted, two separate and distinct four-bar-linkages: (Figs. 2, 13, 14, 15) 22—24, 24—80, 80—81, 81—22 and 22—24, 24—66, 66—70a, 70a—22. The two linkages cause essentially opposite relative knee and ankle rotations during certain phases of the locomotion cycle and each is operative as a conventional four-bar-linkage during a certain portion of the locomotion cycle more or less independently of the other, the said other behaving at that time as an unconventional four-bar-linkage in which one of the links is capable of change in length. The two linkages are never operative, both as conventional four-bar-linkages, at the same time.

The deciding factor as to which linkage system is operative is the conditions imposed on the leg by external forces; and the behavior of the "inoperative" linkage under these circumstances is governed by the built-in resistance to change in length of its variable-length link and by the interconnection between the two linkages. The two linkages have one link in common, i. e. the leg shank 21; they share the foot member 23 which provides link 24—80 for the hydraulic cylinder four-bar-linkage and provides link 24—66 for the slip-joint rod four-bar-linkage; they share the thigh member 20 which provides link 81—22 for the hydraulic cylinder four-bar-linkage and provides link 70a—22 for the slip-joint rod four-bar-linkage; and, finally, they each have a variable-length link, 83 for the former and 67 for the latter linkage. It is, of course, by virtue of the inclusion of these variable-length links, which will and can under proper conditions yield contractively and extensively, that the two linkages can operate more or less independently. The hydraulic cylinder link 83, when unlocked by having its valve 94 in the position shown in Fig. 7, is free to lengthen or shorten but has a resistance to either motion produced by the friction of the piston and shaft seals. The slip-joint link 67, as previously mentioned, is free to lengthen against spring tension and to shorten against a frictional drag. With the foregoing structural characteristics noted, a discussion of the operation of the leg through an ordinary cycle of locomotion and through special cycles will be undertaken.

Figures 10, 12:
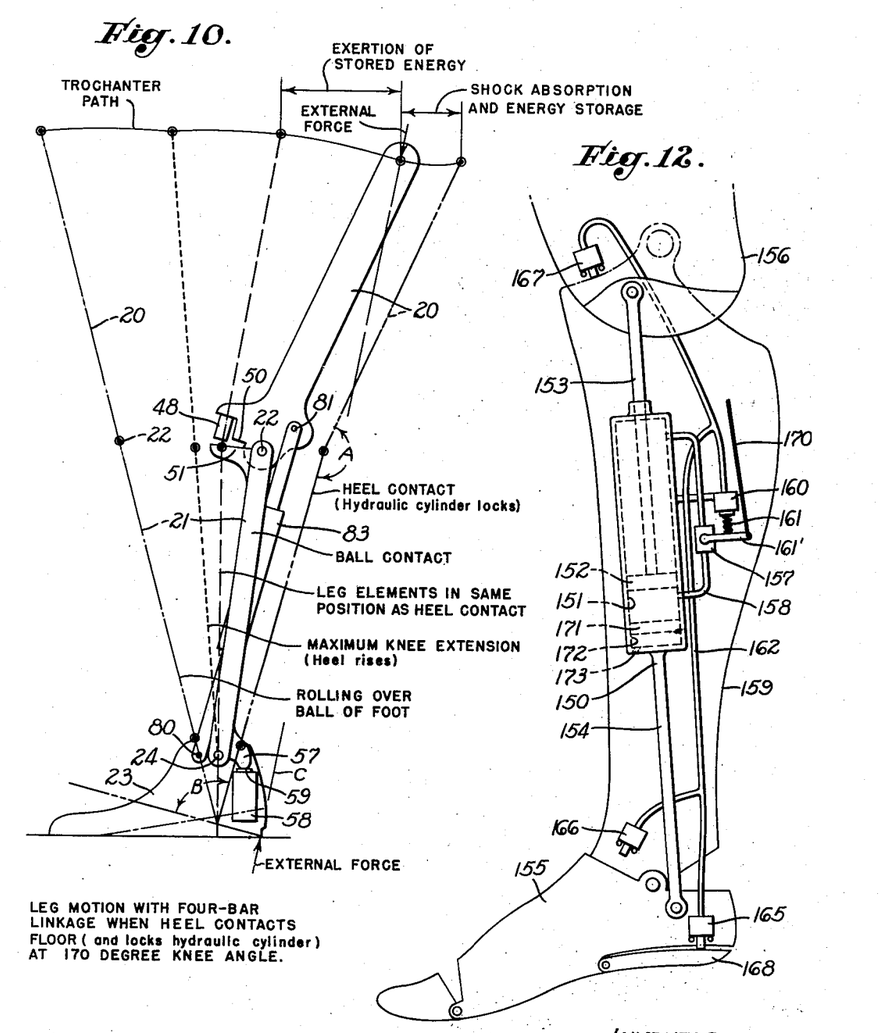
Fig. 10 is a diagrammatic view of the improved leg illustrating the permissible relative movement of the various articulated members during a portion of the locomotion cycle and showing the knee stop and energy storing means while omitting for clarity one of the variable-length links.
Fig. 12 is a diagrammatic side elevational view of an artificial leg embodying an alternative form of automatic hydraulic control means and showing a different arrangement of the locking link.

Assuming that the yieldable knee bumper 48 (Figs. 1, 8, 9) has been adjusted to be active i. e. to undergo compression during knee extension prior to engagement of adjustable positive knee stop means 50, 51 and assuming that the artificial leg is suspended from the thigh stump and has been swung forward during normal locomotion along level ground, the degree of knee flexure or the knee angle at this point in the cycle depends largely upon the amount of "swing-through" force applied by the amputee when the leg is suspended. In normal legs the knee angle at the point in the cycle just prior to placing the heel on the ground is approximately 170° and in the present artificial leg such angles may be maintained, this angle being represented at A in Fig. 10. At this point, the ankle angle B is approximately 90°. As the heel of the foot member 23 is placed against the ground, as indicated by the double dot-dash lines in Fig. 10, and weight is applied to it (about 5 pounds, or less than the leg weight) the pressure plate 135 is forced upwardly against the action of the spring 127 and, operating through the levers 122 and 116, releases the push-rod 113 and valve-actuating rod 105 to permit the valve member 94 to descend under action of spring 99. Such action causes locking of the hydraulic link 83 against contraction so that knee flexion occurring as the result of the application of the external force along line C causes a relative downward movement of link 83 which in turn causes the foot member 23 to rotate counterclockwise as shown in Fig. 10, i. e., plantar-flex. The reactive external force acting at the heel also causes plantar-flexion. The external force assumed to be acting at the trochanter is the vectorial sum of the weight of the amputee acting downward, the inertia force acting downward and the inertia force acting forward.

The simultaneous flexing of the knee (decrease of the angle A in Fig. 10) and plantar-flexing of the foot (increase of the angle B in Fig. 10) is resisted by the spring 60 (Fig. 4) which is compressed progressively as the knee flexes and the foot plantar flexes. The spring 60 therefore acts to prevent slapping of the foot on the ground and as a shock absorber and energy storage means, the energy being stored as the weight of the amputee transfers to the artificial leg. The maximum permissible plantar-flexion is controlled by the engagement of the arm 57 with the plunger 59 and casing 58. Simultaneously with knee flexion and foot plantar-flexion, shank member 21 pivots forwardly on the ankle bolt 24 to the position illustrated by the full line outline in Fig. 10, at which time the foot is flat on the ground.

Figures 13, 13A:
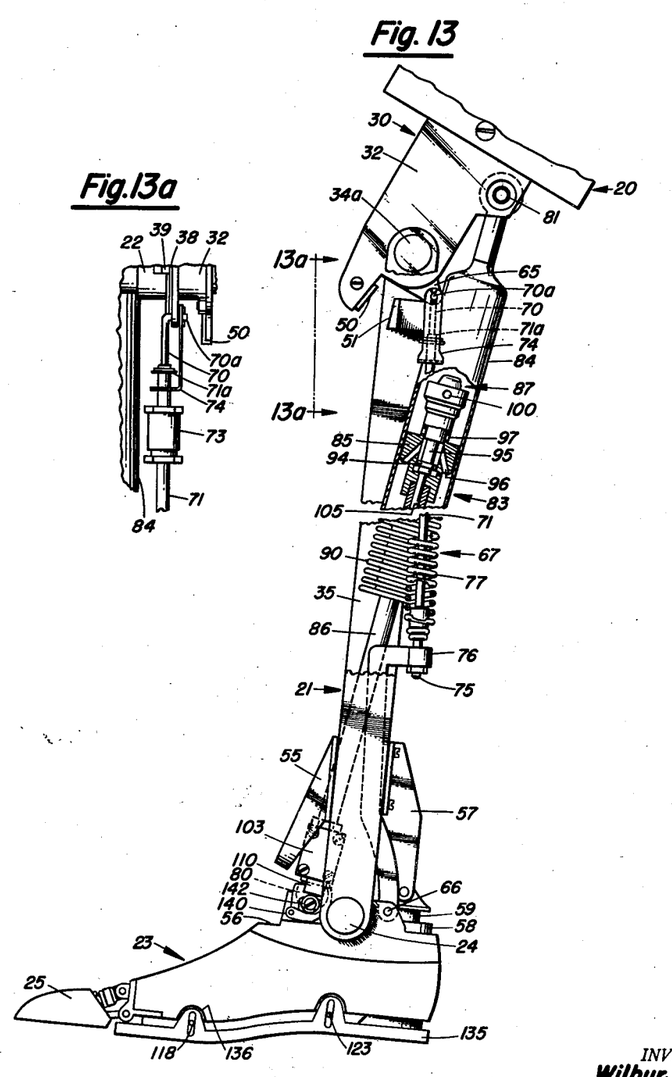
Figs. 13, 14 and 15 are side views of the embodiment of Fig. 1 in successive phases in the locomotion cycle corresponding generally to the succession of phases in Fig. 10.
Fig. 13a is a fragmentary view taken in the direction 13a—13a of Fig. 13.

The complete structure corresponding to such a position is shown, with the angles slightly exaggerated for better illustration, in Fig. 13 where it is apparent that the valve 94 is in a closed position by virtue of pressure on the plate 135 and the hydraulic link 83 is consequently locked. From the time the heel of the foot touched the ground the amputee has been applying a force to the thigh 20 in a direction tending to rotate the thigh clockwise relative to the shank 21 as viewed in Fig. 10. This force tends to compress and thus compel contraction of both the hydraulic link 83 and the slip-joint link 67. Because the effect of this force on 83 is normally insufficient to cause it to contract, link 83 tends to act as a conventional rigid link in its four-bar-linkage allowing knee flexure while causing predetermined interrelated change in ankle angle. However, the link 67 tends to oppose knee flexure. But the frictional resistance to contraction designed into link 67 is less than the effect on it of the force tending to cause knee flexure. Therefore the hydraulic cylinder four-bar-linkage is permitted to govern the leg action at this time and, as the knee flexes under this governing, the link 67 merely contracts as required by the geometry, rod 70 sliding down into tube 71. This contraction is evident in Fig. 13 and especially in Fig. 13a (included for this purpose) and is conveniently measured by the distance between the foot of the bracket 74 and the end 71a of the tube 71.

Figures 14, 16, 17, 18:
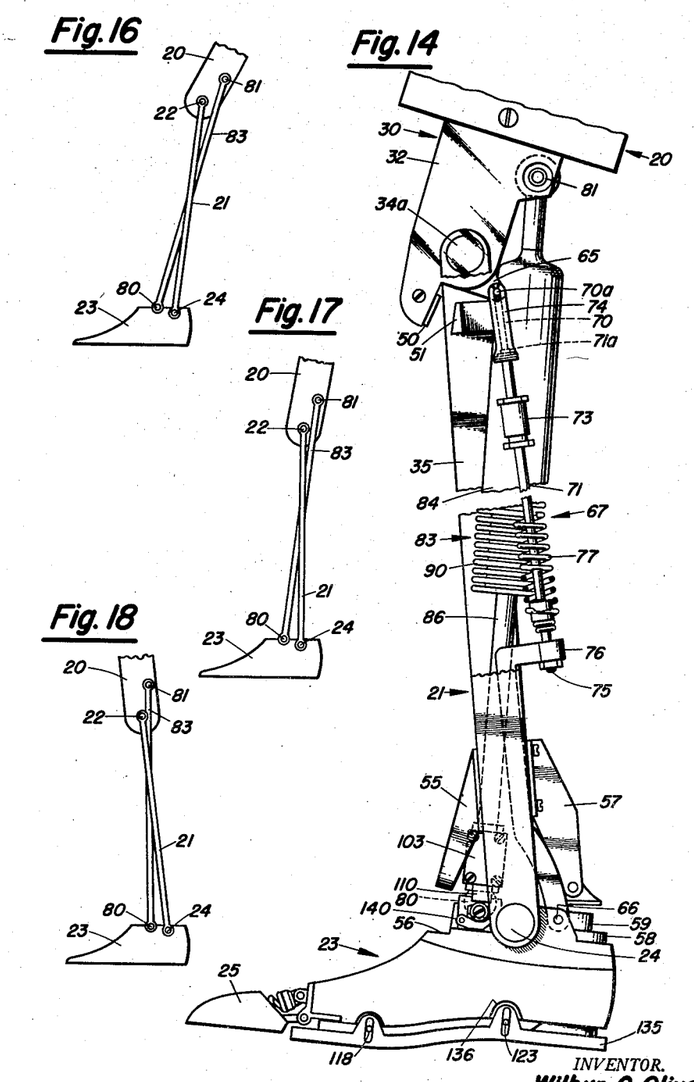
Figs. 16, 17 and 18 are diagrammatic views showing the sequence of configurations of the hydraulic cylinder four-bar-linkage during a portion of the locomotion cycle.

As the locomotion progresses and the body moves forwardly to move the artificial leg to the position indicated by the dash line in Fig. 10, the stored up energy will be expended in the form of work so as to assist the amputee in moving forward on this leg. During the forward moving motion of the leg on the ankle bolt 24 the knee bolt 22 moves through an arc described about 24 as a center. The upper connection 81 of the hydraulic link 83, however, moves through an arc which is eccentric with respect to the arc described by 22 so that the knee is caused to extend, thus straightening the leg. During this movement the connection 70a is, of course, also rotated counterclockwise about the knee bolt 22 thus extending link 67, first by drawing rod 70 back out of tube 71. In the dash-line position in Fig. 10 link 67 finds itself substantially at normal length with the foot of bracket 74 snug against the end 71a of tube 71 and the spring 77 unextended. This is shown in Fig. 14 which shows the complete structure in a configuration corresponding generally to the dash-line position of Fig. 10 (with some exaggeration of angles again for the sake of better illustration). The valve 94 has, of course, remained closed and hence the hydraulic link locked since pressure is still on plate 135. It may be noted that as the body moved forward changing the leg from the full line position in Fig. 10 to the dash-line position the hydraulic cylinder four-bar-linkage motion and hence the relative motions of the leg elements have reversed until, in the dash-line position, the leg elements are in the same relative position as at the instant of heel contact.

Figure 15:
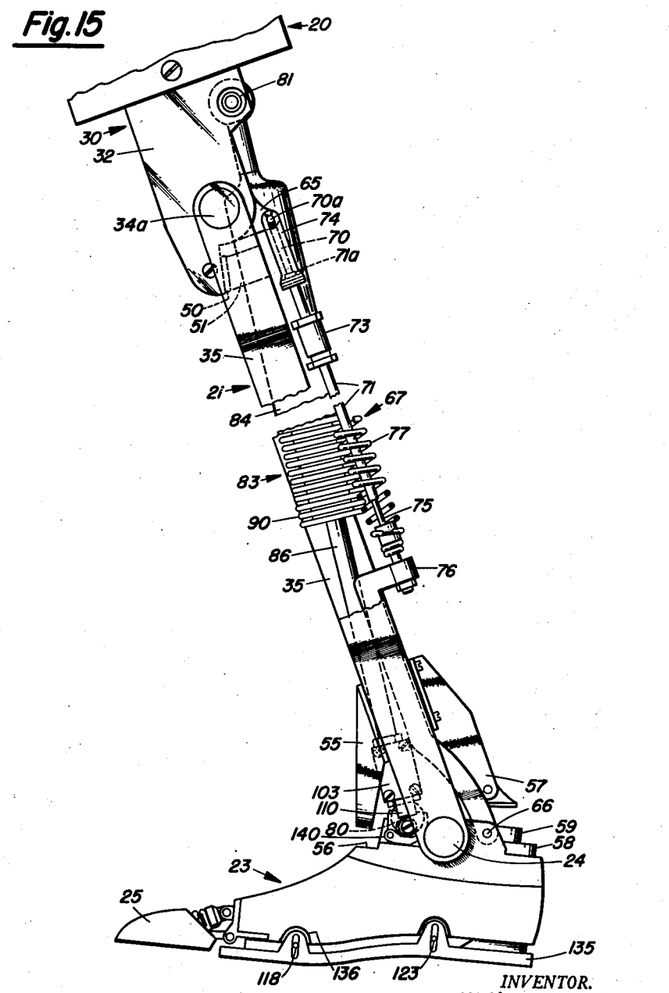

Continuing motion of the leg from the dash-line position, duplicating the heel-contact configuration, toward the dotted line position Fig. 10 does not yet cause the heel to rise because the hydraulic four-bar-linkage will continue to operate, the compression of the knee bumper allowing the required relative motion between thigh 20 and shank 21. However, when the leg actually arrives at the dotted line position in Fig. 10 the stop means 50—51, Figs. 6, 8, 9, will act to prevent further relative pivotal movement between the thigh and shank members in a direction which would cause further extension of the knee. The linkage motion is then stopped, the hydraulic four-bar-linkage being locked since relative rotation of two of its links, 20 and 21, has been stopped by stop means 50—51. It may be noted incidentally that the motions bringing the leg to the dotted line position in Fig. 10 cause further extension of the link 67 occurring as the foot of bracket 74 engages tube end 71a and thereby draws tube 71 along rod 75 which extends spring 77. The complete structure corresponding generally to the dotted line position in Fig. 10 is shown in Fig. 15, the extension of spring 77 being evident and the displacement of tube 71 relative to rod 75 being apparent from the visibility of a portion of rod 75 between the coils of the spring 77. As in Figs. 13 and 14 the angles in Fig. 15 have been exaggerated for clarity but it should be noted that the configurations shown in these three figures can actually occur but would do so when the leg is used to walk up an incline.

Since, as hereinbefore noted, in the dotted line position Fig. 10 the hydraulic cylinder four-bar-linkage is locked against motion that would cause further extension of the knee and since the hydraulic link 83 cannot contract, the three components 20, 21, 23 of the leg are held against relative pivotal movement and a rigid structure is produced, the hydraulic four-bar-linkage, in effect, having been reduced to a three-bar-linkage. Consequently, as the body of the amputee is moved forwardly to a further extent, as shown by the dot-and-dash line in Fig. 10, the heel portion of the foot member will be raised as the leg rolls on the ball of the foot. During this movement, the pressure plate 135 will remain operative, because of force applied against its forward end, the hydraulic link remaining locked by reason of the lever 131 which is moved by the plate against the action of both springs 133 and 127. As the artificial leg rolls upon the toe portion, the weight of the amputee will gradually shift to the sound leg, which was swung forwardly during the "roll-over" portion of the locomotion cycle, so that eventually the combined strength of the springs overbalances the load sustained by the artificial leg and the pressure plate 135 will be moved to inoperative position. Thus the hydraulic link 83 will become unlocked following transfer of the weight to the sound leg so that knee flexion is permissible.

At this juncture the artificial leg is lifted by the thigh stump and, since the slip-joint link 67 has been previously extended, the spring 77 now acts to draw the connecting element 76 upwardly so as to plantar-flex the foot back giving a "kick off" action to assist in raising the artificial leg. The artificial leg is then simultaneously raised and moved forwardly in a "swing through" phase. Since the shank member 21 tends to lag the motion of the thigh piece because of inertia of the member 21 and its connected parts, lifting of the leg causes relative pivotal movement between the thigh and shank members to flex the knee, the rate of flexing being controlled by the friction-inducing means shown at 38 in Fig. 5. During flexure of the knee, force is applied through the slip-joint link 67 against the pin 66 so that the foot member is caused to dorsiflex about the ankle bolt 24 at a predetermined ratio with the flexing of the knee. The aforementioned actions of the link 67 indicate that with the leg in space, not touching the ground, the lip-joint rod four-bar-linkage 22—24, 24—66, 66—70a, 70a—22 has taken over and has been controlling the relative motions of the leg elements. This is possible only by virtue of the facts that the hydraulic link 83 has been unlocked and that the friction in the hydraulic piston and shaft seals is less than the friction in the slip-joint link which in turn is less than the tensile force exerted by the spring 77 in opposing extension from its normal length.

During the "swing-through" phase of the locomotion cycle the knee will unflex or extend and the foot will plantar-flex, because of the action of the slip-joint link 67, so that the leg will approach a new "heel contact" position with the main parts again assuming the relative positions indicated by the double dot-dash line in Fig. 10, at which time the hydraulic cylinder will become locked to permit another forward step with the sound leg while the weight of the amputee is supported on the artificial leg.

It should be noted that although a definite knee angle versus ankle angle relationship is maintained during the swing through phase, the foot can be plantar-flexed or dorsiflexed from this relationship by external forces acting on the foot up to the maximum flexion allowed by the stops 55, 57. Under the influence of external forces plantar-flexion can occur by virtue of the slippage of the friction slip joint in the link 67 and when the external forces are removed the foot will remain in the new position. When external forces are applied to produce dorsiflexion of the foot beyond the point at which the link 67 is at its normal length (i. e. tube end 71a snug against the foot of bracket 74 and spring 77 unstretched), the spring 77 is tensed as the slip-joint link 67 increases in length. Removal of the external forces in this case causes the foot to return to the position it originally occupied with link 67 at normal length.

When walking upstairs, substantially the same procedure is followed as when walking along level ground, it being noted that the major difference in these operations is that the knee is flexed to a much greater angle during the stair-climbing operation, that is, at the instant of "heel contact." In walking upstairs, the knee must, therefore, be unflexed through a greater angle.

When walking downstairs step over step, knee flexure must occur when weight is supported by the artificial leg and thus the voluntary lock control 144 must be employed for overriding the automatic control to allow such knee flexure.

The operation of walking up an incline is similar to level walking except that the hydraulic cylinder is locked at a slightly flexed knee condition, as when walking upstairs.

In walking down inclines, initial shock absorption at heel contact is accomplished as in level walking except to a greater degree. Pulling the voluntary control cable 144 then allows the knee to flex further in order to lower the body for the next step on the sound leg. Operation of the voluntary control 144 is not necessary if the artificial foot is placed on the ground with the knee somewhat flexed.

Kneeling is accomplished by bleeding the hydraulic cylinder by means of the voluntary control 144 or the alternative control cable and pulley means 145, 146 (Fig. 11).

Seating of the amputee is effected in a manner similar to kneeling, that is, by bleeding the hydraulic cylinder by the voluntary control cable and associated parts. Use of the voluntary control is not necessary if the full body weight is supported on the sound leg during seating. As the knee flexes with the foot clear of the ground, the rotation of point 70a, the attachment of the slip-joint link 67 to the thigh, first dorsiflexes and then plantar-flexes to the foot after the links 70a—66 and 70a—22 form a straight line. That is, the successive dorsiflexion and plantar flexion of the foot occurs by virtue of the slip-joint four-bar-linkage passing over from an open four-bar-linkage to a crossed four-bar-linkage. The foot returns to a normal position when the knee reaches the seating angle.

An important characteristic of this artificial leg is the provision of means for eliminating the torque that would be acting on the stump when the body weight is being supported by the ball or the toe of the foot, the heel being off the ground. Such a situation causes the top of the stump to press forward against the socket and the bottom of the stump to press rearward against the socket. In the present invention this condition is eliminated by the inclusion of the adjustable knee bumper 48 which provides for the accomplishment of various degrees of modified "peg-leg" walking at the will of the amputee. As previously described, the knee bumper allows for placing the heel on the ground during walking at an adjustably variable knee flexion. When, as also previously described, the foot plantar flexes after "heel contact," the knee flexes under the control of the hydraulic cylinder four-bar-linkage. As the knee flexes, the bumper stop moves away from the aforementioned precompressed knee bumper and then returns to it as the four-bar-linkage reverses itself while the body moves forward. However, the precompressed knee bumper then yields and allows the four-bar-linkage mechanism to continue operating until a "positive" knee stop is contacted at maximum knee extension. This allows the trochanter to move forward of the ankle pivot before the heel rises, as shown in the dotted line position in Fig. 10, for example, and therefore provides a modified "peg-leg" walk with the bottom of the "peg" at the ankle bolt. This is a "modified" peg-leg action in that the knee is not straight at all times, the angle changing as the locomotion progresses. If the knee bumper is so adjusted that the resultant center of body-weight application in the socket is vertical to the ball of the foot at the time the knee becomes straight, and hence the heel rises, no fore-and-after torque will be applied to the stump.

*Alternative leg structure*

Another preferred embodiment of the invention with the hydraulic lock cylinder in tension is shown in Fig. 12. Having the hydraulic lock cylinder in tension possesses the advantage of accommodating a longer stump because of the location of the attachment of the hydraulic link to the thigh piece. The link 150 includes a cylinder 151, a piston 152, a piston rod 153 and a floating piston 171, the cylinder having a rod 154 pivotally connected to a foot member 155, rearwardly of the ankle bolt, and the piston rod being pivotally connected to a thigh member 156, forwardly of the knee pivot. By this alternative connection, the link 150 is normally in tension and effectively resists knee collapse. Flow of fluid from one side of the piston 152 to the other is controlled by a valve 157 connected in a hydraulic line 158. The floating piston 171, being free to move axially in the cylinder 151, acts as an accumulator to compensate for volume changes due to temperature and the piston rod 153 moving in or out of the cylinder. The chamber 172 is vented to atmosphere at 173. The leg has a shank member 159 and a slip-joint rod (not shown) similar to the one previously described in connection with the embodiment illustrated in Fig. 1.

The use of a lock cylinder in compression as shown in Fig. 1 is preferable, where possible, so as to avoid the necessity of sealing the high pressure existing in the upper part of cylinder 151 against leakage to atmosphere where the piston rod 153 projects from the cylinder.

The valve 157 is adapted to be actuated by a pressure-responsive element 160 carried by the cylinder 151, the element operating through a resilient means 161 to turn the arm 161' of the valve. The element 160 is connected to a flexible hydraulic line 162 in which a series of three pressure-inducing devices 165, 166 and 167 are also connected, pressure developed in the line, due to actuation of any of said devices, being communicated to the element 160 to operate the same. The device 165 is carried by the foot member 155 and operated by a pivotal heel member 168 on the foot member. The device 166 is preferably mounted on the leg shank member 159 and adapted to be operated by and in response to maximum dorsiflexure of the ankle. The device 167 is carried by the thigh member 156 in position to be actuated by the shank member at maximum knee extension. A voluntary control cable 170 is connected to the valve arm 161' for overriding the action of element 160 to unlock cylinder 151. By this system of separate control devices, the hydraulic cylinder 151 is locked at heel contact, maximum dorsiflexure of the foot, and at maximum knee extension. During the locomotion cycle, the knee is extended and the device 167 is thus operated prior to the inactivation of the device 165 so that the link 150 will remain locked during the rolling of the leg on the ball of the foot. It is to be noted that by this arrangement, when the knee is flexed and the heel rises at maximum dorsiflexion (which would cause inactivation of the devices 167 and 165) as is the case when walking downstairs, the ankle control device 166 is actuated by the foot member 155 so that the cylinder 151 remains locked to prevent further flexing of the knee and collapsing of the leg.

While I have herein shown and described the artificial limb as embodied in two preferred forms of construction and operated in a particular manner to produce certain leg motions, it will be apparent that various modifications might be made in the structure and that the limb may be operated to effect other desirable conditions not discussed herein. It will also be understood that the improvement four-bar-linkage system disclosed herein might, with certain modifications within the concept of my invention, be applied to other devices such as artificial arms. Therefore, I do not wish to be limited to the exact structure or method of application herein disclosed but desire to be afforded the full scope of the appended claims.

I claim as my invention:

1. An artificial leg, comprising: a thigh member adapted for attachment to the thigh stump of an amputee; a leg member pivotally connected to said thigh member and providing a knee therebetween; a foot member pivotally connected to said leg member and providing an ankle therebetween; an extensible, contractible link member operatively connected between said thigh member and said foot member in a manner such that relative pivotal movement between said thigh and leg members normally causes either like relative pivotal movement between said leg and foot members so that said knee and said ankle are simultaneously flexed or reverse pivotal movement so that increase in the knee angle causes decrease in the ankle angle and decrease in said knee angle causes increase in said ankle angle; an extensible, contractible, fluid-actuated locking link connected between said thigh and foot members, said locking link including a cylinder and a piston slidable in said cylinder; valve means for controlling the flow of fluid in said cylinder so as to control the extension and contraction of said locking link; fluid-pressure responsive operating means carried by said cylinder for operating said valve means; and a plurality of pressure-inducing control devices, each in fluid communication with said valve operating means, the first of said devices being disposed at the heel portion of said foot member and operable, in response to a force exerted thereagainst by the weight of the amputee, to actuate said valve operating means in a manner to effect locking of said locking link to control flexure of said knee in response to flexing of said foot member, said first device being rendered inactive as the heel portion is elevated during forward locomotion of the artificial leg, the second of said devices being disposed adjacent said knee and operable, in response to a predetermined extension of said knee, and prior to inactivation of said first device, to maintain said valve operating means operative so as to prevent flexure of said knee until the weight of the amputee is shifted from the artificial leg to the sound leg of the amputee, said second device then becoming inoperative during the swing-through phase of the locomotion cycle when said thigh and leg members are relatively pivoted.

2. An artificial leg as defined in claim 1 and including voluntary control means operatively connected to said pressure responsive valve-operating means and adapted to inactivate said valve operating means during the actuation of any of said control devices.

3. An artificial leg structure including a thigh member adapted to be attached to the thigh stump of an amputee to provide an extension of the stump, a shank member pivotally connected to the lower end of the thigh member and providing an articulated knee joint therebetween, a foot member connected to the lower end of the said shank member and including an articulated ankle joint therebetween, and releasable locking means connected directly to the foot member on one side of the ankle joint and directly connected to the thigh member on an opposite side of the knee joint so as to be free, when locked, to move relative to said shank member, the said locking means including a fluid-containing cylinder, a fluid-actuated piston in the cylinder, and cooperating valve means in the cylinder and piston for controlling the relative sliding movement of the cylinder and piston, the valve means being operable responsively to application of weight on the leg by the amputee.

4. An artificial leg structure including a thigh member adapted to be attached to the thigh stump of an amputee to provide an extension of the stump, a shank member pivotally connected to the lower end of the thigh member and providing an articulated knee joint therebetween, a foot member connected to the lower end of the shank member and including an articulated ankle joint therebetween, and releasable locking means connected directly to the foot member on one side of the ankle joint and directly connected to the thigh member on an opposite side of the knee joint, the said locking means including a fluid-containing cylinder pivoted to the thigh member, a fluid-actuated piston slidable in the cylinder and pivoted to the foot member, the said piston dividing the cylinder into a high pressure chamber and a low pressure chamber and provided with a port communicating between the chambers for passage of fluid from one chamber to the other, shiftable valve means in the cylinder, and valve actuating means operable responsively toi weight exerted on the leg by an amputee by shifting the valve means, the said valve means being adapted to control the flow of fluid from one chamber to the other, and operable when predeterminedly shifted, to permit flow of fluid from the low pressure chamber in the cylinder to the high pressure chamber while preventing return flow, thereby causing relative movement of the cylinder and piston and unflexing the knee joint while locking the cylinder and piston against contraction to prevent involuntary flexing of the knee.

5. An artificial leg structure including a thigh member adapted to be attached to the thigh stump of an amputee to provide an extension of the stump, a shank member pivotally connected to the lower end of the thigh member and providing an articulated knee joint therewith, a foot member connected to the lower end of the shank member and including an articulated ankle joint therewith, and releasable locking means connected directly to the foot member and to the thigh member, the said locking means comprising a fluid-containing cylinder pivotally connected to the thigh member, a fluid-actuated piston slidable in the cylinder and pivotally connected to the foot member, the pivotal connection of the fluid-actuated piston being on one side of the ankle joint and the pivotal connection of the cylinder to the thigh member being on an opposite side of the knee joint, the said piston dividing the cylinder into a high pressure chamber and a low pressure chamber and provided with a port communicating with the chambers through which fluid from the cylinder is adapted to flow from one chamber to the other chamber, the piston also having a by-pass having a check valve therein, vave means in the piston for opening and closing the port, the said valve means being normally disposed in selected positions to maintain the port open for enabling flow of fluid from the high pressure chamber to the low pressure chamber, and reversely, so as to cause a relative extension and contraction of the piston in the cylinder for corresponding flexing and unflexing of the knee, the said valve means being movable to a second position to close the port to enable flow of fluid from the low pressure chamber through the by-pass and check valve into the high pressure chamber, thereby controlling amount of relative movement between the cylinder and piston, spring means in the piston for moving the valve into closing position relative to the port, a valve operating rod slidable in the piston and engageable with the valve, and actuating means movable on the foot member and operatively connected to the said rod and normally operative to slide the rod in one direction to maintain the valve means in position for opening the port but operable in response to a weight applied by the amputee to the leg to permit the rod to slide in the reverse direction to allow the movement of the valve to the port-closing position.

6. An artificial leg assembly comprising a thigh portion, a shank portion, and a foot member, a knee pivot for pivotally connecting the shank portion to the thigh portion, an ankle joint pivotally connecting the foot member to the shank portion, and a substantially rectilinearly expansible and contractible link pivotally connected directly to the foot member on one side of the ankle joint and to the thigh member on the opposite side of the knee joint, said link being free to move bodily relative to said shank portion with a motion having a translational component.

7. An artificial leg assembly comprising a thigh portion, a shank portion, and a foot member, a knee pivot for pivotally connecting the shank portion to the thigh portion, an ankle joint pivotally connecting the foot member to the shank portion, and a fluid-actuated substantially rectilinearly extensible and contractible link pivotally connected directly to the foot member on one side of the ankle joint and to the thigh portion on an opposite side of the knee pivot, that part of the link that is immediately adjacent and is pivotally connected directly to the foot member being capable of only substantially rectilinear motion with respect to that part of the link that is immediately adjacent and is pivotally connected directly to the thigh portion.

8. An artificial leg assembly comprising a thigh member, a shank member, and a foot member, means pivotally connecting the shank member to the thigh member, means pivotally connecting the foot member to the shank member, and a locking assembly connected to the thigh member and to the foot member and crossing a straight line connecting the pivotal connecting means between the thigh and shank members and between the foot and shank members and completing a four-bar crossed kinematic linkage composed of the said thigh, shank, and foot members, and the locking assembly, said four-bar linkage including effectively only four pivotal connections.

9. An artificial leg assembly comprising a thigh portion, a shank portion, and a foot member, a knee joint pivotally connecting the shank portion to the thigh portion, an ankle joint pivotally connecting the foot member to the shank portion, a fluid-actuated substantially rectilinearly extensible and contractible link pivotally connected directly to the foot member on one side of the ankle joint and to the thigh portion on an opposite side of the knee pivot, every portion of the link being free to rotate simultaneously relative to the thigh portion about the axis of the pivotal connection to the thigh portion and relative to the foot member about the axis of the pivotal connection to the foot member and means responsive to fluid pressure for controlling extension and contraction of said link.

10. An artificial leg assembly comprising a thigh portion, a shank portion, and a foot member, a knee joint for pivotally connecting the shank portion of the thigh portion, an ankle joint pivotally connecting the foot member to the shank portion, and a substantially rectilinearly expansible and contractible locking assembly connected directly to the foot member anteriorly of the ankle joint and to the thigh portion posteriorly of and above the knee joint, that part of the locking assembly that is immediately adjacent and directly connected to the foot member being capable of only substantially rectilinear motion with respect to that part of the locking assembly that is immediately adjacent and connected directly to the thigh portion, whereby upon flexing of the knee joint the said locking assembly is placed under compression for plantar-flexing the foot during walking.

11. An artificial leg assembly comprising a thigh portion, a shank portion, and a foot member, a knee joint for pivotally connecting the shank portion to the thigh portion, an ankle joint pivotally connecting the foot member to the shank portion, and a substantially rectilinearly expansible and contractible locking assembly connected directly to the thigh portion anteriorly and below the knee joint and to the foot member posteriorly of the ankle joint, that part of the locking assembly that is immediately adjacent and connected directly to the thigh portion being capable only of substantially rectilinear motion with respect to that part of the locking assembly that is immediately adjacent and connected directly to the foot member, whereby upon flexing of the knee pivot the locking assembly is placed under tension for causing plantar-flexing of the foot during walking.

12. An artificial leg assembly comprising a thigh portion, a shank portion, and a foot member, a knee joint pivotally connecting the shank portion to the thigh portion, an ankle joint pivotally connecting the foot member to the shank portion, a substantially rectilinearly expansible and contractible locking assembly connected directly to the foot member on one side of the ankle joint and to the thigh portion on an opposite side of the knee joint, that part of the locking assembly that is immediately adjacent and connected directly to the thigh portion being capable only of substantially rectilinear motion with respect to that part of the locking assembly that is immediately adjacent and connected directly to the foot member, and control means for effecting actuation of the locking assembly responsively to contact of a portion of the foot with a surface during walking.

13. An artificial leg assembly comprising a thigh member, a shank member, and a foot member, means pivotally connecting the thigh member to the shank member to provide a knee joint, means pivotally connecting the shank member to the foot member to provide an ankle joint, and a link connected directly to the thigh member and to the foot member, the said link being connected to the foot member at a point disposed rearwardly of the ankle pivot, and also being connected to the thigh member at a point disposed rearwardly of the knee joint when the leg assembly is extended, whereby the point of connection of the link to the thigh member moves in an arcuate path about and forwardly relative to the knee joint to dorsiflex the foot member at knee flexions encountered in walking and successively to plantar-flex the foot member to neutral position as the knee joint is flexed to sitting position.

14. An artificial leg assembly comprising a thigh member, a shank member, and a foot member, means pivotally connecting the thigh member to the shank member to provide a knee joint therebetween, means pivotally connecting the shank member to the foot member to provide an ankle joint therebetween, and an extensible and contractible slip joint link connected directly to the thigh member and to the foot member, the slip joint link being connected to the foot member at a point disposed rearwardly of the ankle joint, the said slip joint link also being connected to the thigh member at a point disposed rearwardly of the knee joint when the leg assembly is extended, whereby the point of connection of the slip joint link to the thigh member moves in an arcuate path about and forwardly relative to the knee joint and to dorsiflex the foot member at knee flexions encountered in walking, and successively to return the foot member to neutral position as the knee joint is flexed to sitting position, and resilient means for contracting the slip joint link from its extended position.

15. An artificial leg assembly comprising a thigh portion, a shank portion, and a foot member, a knee pivot for pivotally connecting the shank portion to the thigh portion, an ankle joint pivotally connecting the foot to the shank portion, a substantially rectilinearly expansible and contractible link pivotally connected directly to the foot member on one side of the ankle joint and to the thigh member on the opposite side of the knee joint, and an extensible and contractible slip joint link connected directly to the thigh member and to the foot member, the said slip joint link member being connected to the foot member at a point disposed rearwardly of the ankle joint, the slip joint link also being connected to the thigh member at a point disposed rearwardly of the knee joint when the leg assembly is extended, whereby the point of connection of the slip joint link to the thigh member moves in an arcuate path about and forwardly relative to the knee joint to dorsi-flex the foot member at knee flexions encountered in walking and successively to plantar-flex the foot member as the knee joint is flexed to sitting position.

16. An artificial leg assembly comprising a thigh member adapted to be attached to the thigh stump of an amputee to provide an extension of the stump, a shank member pivotally connected to the lower end of the thigh member to provide a flexible knee therebetween, a foot member pivotally connected to the lower end of the shank member to provide a flexible ankle therebetween, an extensible and contractible link connected directly to the thigh member and to the foot member and including a fluid-actuated knee lock, the said link being connected to the foot at one side of the flexible angle and to the thigh at an opposite side of the flexible knee to form one side of a crossed kinematic link of which the said thigh, shank and foot members are components, and a slip joint link connected between the thigh member and the foot member and forming one side of a second four-bar-linkage of which the said thigh, shank and foot members are components, the said crossed linkage and second four-bar-linkage each effecting relative knee and ankle rotations, and each being independently operable during different portions of the locomotion cycle of the leg.

17. An artificial leg assembly comprising a thigh member adapted to be attached to the thigh stump of an amputee to provide an extension of the stump, a shank member pivotally connected to the lower end of the thigh member and providing a flexible knee therebetween, a foot member pivotally connected to the lower end of the shank member and providing a flexible ankle therebetween, a first four-bar-linkage consisting of the said thigh, shank and foot members and the first extensible, contractible link connected between the thigh and foot members, the said first link including a fluid-actuated lock operable to lock the knee against flexure during a portion of the locomotion cycle of the leg, a second four-bar-linkage consisting of the thigh, shank and foot members, and a second extensible and contractible link connected between the thigh and foot members, the first and second four-bar-linkages each effecting knee and ankle rotations, and each being independently operable during different portions of the locomotion cycle of the leg.

18. An artificial leg assembly comprising a thigh member, a shank member, and a foot member, means pivotally connecting the shank member to the thigh member to form a knee joint therebetween, means pivotally connecting the foot member to the shank member and defining an ankle joint therebetween, a locking assembly connected to the thigh member and the foot member and crossing a straight line connecting the knee joint and the ankle joint and completing a four-bar crossed kinematic linkage composed of the said thigh, shank and foot members and the locking assembly, and a second extensible and contractible link connected between the thigh and foot members, the said second link having one end pivotally connected to the thigh member at a point substantially intermediate the pivotal connections between the said thigh and shank members and between the said thigh member and the locking assembly and its other end pivotally connected to the shank member at a point disposed rearwardly of the ankle joint between the shank and foot members.

19. An artificial leg assembly comprising a thigh member, a shank member, and a foot member, means pivotally connecting the shank member to the thigh member to form a knee joint therebetween, means pivotally connecting the foot member to the shank member and defining an ankle joint therebetween, a locking assembly connected to the thigh member and the foot member and crossing a straight line connecting the knee joint and the ankle joint and completing a four-bar crossed kinematic linkage composed of the said thigh, shank and foot members and the locking assembly, and a second extensible and contractible link connected between the thigh and foot members, the said second link having one end pivotally connected to the thigh member at a point substantially intermediate the pivotal connections between the said thigh and shank members and between the said thigh member and the locking assembly and its other end pivotally connected to the shank member at a point disposed rearwardly of the ankle joint between the shank and foot members, actuating means operable responsively to the weight of the amputee for effecting actuation of the locking assembly so as to lock the said assembly against contraction and thus control the flexure of the knee during part of the step when the major portion of the weight of the amputee is supported by the said leg assembly, and stop means for limiting the extension of the said knee, the said locking assembly being connected to the thigh member and to the foot member and crossing a straight line connecting the knee joint and the ankle joint and completing a four-bar crossed kinematic linkage composed of the said thigh, shank and foot members and the locking assembly, the said crossed linkage then becoming rigid and acting to prevent knee and ankle rotations in one direction so as to cause the entire leg assembly to roll over the ball of the foot member during the remainder of that portion of the forward step when the major portion of the weight of the amputee is supported by the leg assembly, the said actuating means becoming inactive at the completion of the rolling movement of the leg assembly and when at least a portion of the weight of the amputee is sustained by the sound leg of the amputee so as to permit flexing of the knee and unflexing or flexing of the ankle under the action of a second four-bar-linkage including the said extensible and contractible link during the swing-through phase of the step of the leg assembly.

20. A structure as defined in claim 19 and including energy-storing means adapted to store energy when the weight of the amputee is first transferred to the heel of the foot member and the foot plantar-flexes, and adapted to release the energy when the foot directly flexes as the body moves forward so as to assist in raising the body of the amputee.

WILBUR C. OLIVER.

(References on following page)

REFERENCES CITED

The following references are of record in the file of this patent:

FOREIGN PATENTS

| Number | Country | Date |
|---|---|---|
| 24,016 | France | Nov. 15, 1921 |
| 1st addition to 530,623 | | |
| 24,035 | France | Apr. 23, 1920 |
| 1st addition to 530,887 | | |
| 25,532 | France | Dec. 28, 1922 |
| 2nd addition to 530,887 | | |
| 498,934 | France | Nov. 4, 1919 |
| 523,329 | France | Oct. 23, 1919 |
| 530,623 | France | Oct. 6, 1921 |
| 530,887 | France | Oct. 12, 1921 |